United States Patent [19]

Röhm

[11] Patent Number: 4,607,855
[45] Date of Patent: Aug. 26, 1986

[54] HAMMER DRILL CHUCK

[76] Inventor: Günter H. Röhm, Heinrich-Röhm-Strasse 50, D-7927 Sontheim, Fed. Rep. of Germany

[21] Appl. No.: 686,243

[22] Filed: Dec. 26, 1984

[30] Foreign Application Priority Data

Jan. 4, 1984 [DE] Fed. Rep. of Germany ....... 3400149

[51] Int. Cl.⁴ .............................................. B23B 31/12
[52] U.S. Cl. .................................... 279/62; 279/1 ME
[58] Field of Search ................ 279/1 ME, 1 R, 60–65

[56] References Cited

U.S. PATENT DOCUMENTS

| 1,361,571 | 12/1920 | Eden, Jr. | 279/1 R |
| 4,213,622 | 7/1980 | Rohm | 279/61 |
| 4,272,087 | 6/1981 | Rohm | 279/62 |
| 4,413,689 | 11/1983 | Hughes et al. | 279/1 ME |

FOREIGN PATENT DOCUMENTS 0027705 3/1981 Japan ................................. 279/1 R Primary Examiner—Gil Weidenfeld
Assistant Examiner—Gary F. Paumen
Attorney, Agent, or Firm—Karl F. Ross; Herbert Dubno

[57] ABSTRACT

A drill chuck includes a chuck body connected to a drilling spindle and having a tool holding fixture for retaining a drill bit between jaws. Accommodated in the chuck body is a through-passage which leads to the tool holding fixture and through which the impact of the spindle onto the drill bit is transmitted. A tightening ring is rotatable about the chuck body in order to allow loosening and tightening of the drill bit and is connected to an adjusting sleeve which is arranged at a distance to the chuck body to define an annular space therebetween. In order to allow discharge of any dirt penetrating through the jaws and into the tool holding fixture channels are provided between one end of the annular space and the tool holding fixture. The other end of the annular space is connected to the outside so that dirt can be transported through the channels and the annular space towards the outside.

4 Claims, 3 Drawing Figures

HAMMER DRILL CHUCK

CROSS REFERENCE TO RELATED APPLICATIONS

| Serial Number | Filing Date |
|---|---|
| 591,975 | March 21, 1984 |
| 654,791 | September 26, 1984 |
| 654,792 | September 26, 1984 |
| 702,049 | February 15, 1984 |
| 703,888 | February 21, 1985 |
| 719,760 | April 4, 1985 |
| 720,259 | April 5, 1985 |
| 726,587 | April 23, 1985 |
| 726,596 | April 23, 1985 |
| 731,665 | May 7, 1985 |
| 743,583 | June 11, 1985 |
| 744,795 | June 13, 1985 |

FIELD OF THE INVENTION

My present invention relates to a drill chuck and, more particularly, to a drill chuck for percussion drilling or hammer-drill applications.

BACKGROUND OF THE INVENTION

In my U.S. Pat. No. 4,272,087, I describe a drill chuck having a chuck body connected to a drill spindle connectible to the drive of a hammer or percussion drill capable of rotating the chuck while imparting axial blows to the chuck and a tool (i.e. a drill bit) held therein.

The chuck body accommodates a holding fixture for clamping one drill bit between jaws which are movable via a tightening ring connected to an adjusting sleeve.

The sleeve is provided with a toothed skirt which is engageable by a locking member so that no unintentional rotational movement of the sleeve relative to the chuck body in loosening direction is possible and thus an undesired unlocking of the chuck is prevented. In order to allow a loosening of the drill bit, the sleeve cooperates with a loosening ring which acts on the locking member to disengage the latter from the toothed skirt.

In such drill chucks, dirt tends to accumulate in the interior and constitutes a potential and substantial danger of contamination for the chuck, especially during overhead drilling since, in this case, the detritus drops directly downwardly between the jaws into the holding fixture of the chuck and eventually causes a deterioration of the functional properties of the chuck. It thus becomes necessary to disassemble and clean the chuck, a process which is cumbersome, time consuming and usually requires the expertise of a specialist.

OBJECTS OF THE INVENTION

It is thus the principal object of my present invention to provide an improved drill chuck obviating the drawbacks of prior art drill chucks.

Another and more specific object is to provide a self-clearing chuck, especially for hammer or percussion drills, whereby detritus accumulation is precluded.

Yet a further object is to provide a chuck which cannot be rendered inoperative by accumulated detritus and which therefore has an especially long useful life.

SUMMARY OF THE INVENTION

These objects are realized, according to my invention, by providing between the jaw tightening sleeve and the chuck body with at least one detritus-ejecting channel which leads to the holder bore retaining the tool (i.e. a hammer-drilling bit). The channel communicates with an annular space defined between the chuck body and tightening means cooperating with the holding means to tighten or loosen the implement. In order to allow a transport of dirt towards the outside, the tightening means are provided with discharge openings which communicate with the annular space and extend to the outside.

Through the provision of such a modified chuck, dirt accumulated during drilling and penetrating to the holding means is immediately discharged through centrifugal force through the channels and the annular space and eventually through the discharge openings to the outside. Consequently, the dirt is prevented from being collected in the drill chuck and from penetrating between parts of the chuck moving or movable with respect to each other.

According to a further feature of the invention, the chuck body defines a through-passage in elongation of which the holding means being provided whereby the channels extend from the annular space and lead to the holding means immediately next to the axial through-passage. Consequently, an accumulation of dirt in front of the end portion of the spindle which end portion constitutes a head which can impact upon the drill bit, and a penetration of dirt between the head of the spindle and the drill bit within the axial through-passage is prevented.

In a preferred embodiment, the channels formed within the chuck body and connecting the annular space with the holding means extend to the rear portion of the chuck at an open acute angle with respect to the chuck axis. This embodiment is in particular advantageous during overhead drilling since the dirt is transported outwardly and downwardly through the thus slopingly extending channels so that the discharge of the dirt is not only obtained by centrifugal forces but also enhanced through the effect of gravity. It is preferred to provide the annular space as well as the discharge openings in such a manner that they extend also downwardly so that the gravity supports the discharge of the dirt during an overhead drilling therethrough.

Accordingly, in order to provide the discharge openings in the preferred manner, the tightening means includes an adjusting sleeve which surrounds the chuck body at a distance therefrom and has an innerside provided with a toothed skirt having a plurality of teeth whereby gaps between adjacent teeth form a part of the discharge openings. In addition, the tightening means includes a loosening ring which is arranged coaxially above the adjusting sleeve and is provided with a plurality of indentations at its periphery so that interstices are defined between the loosening ring and the surrounded chuck body. These interstices are in alignment with respective gaps of the toothed skirt and form another part of the discharge openings.

Preferably, the loosening ring is axially aligned with the adjusting sleeve and the interstices extend over the entire height of the loosening ring in order to allow connection with the outside.

BRIEF DESCRIPTION OF THE DRAWING

The above and other objects, features and advantages of my present invention will become more readily apparent from the following description, reference being made to the accompanying drawing in which.

SPECIFIC DESCRIPTION

Figure 1:
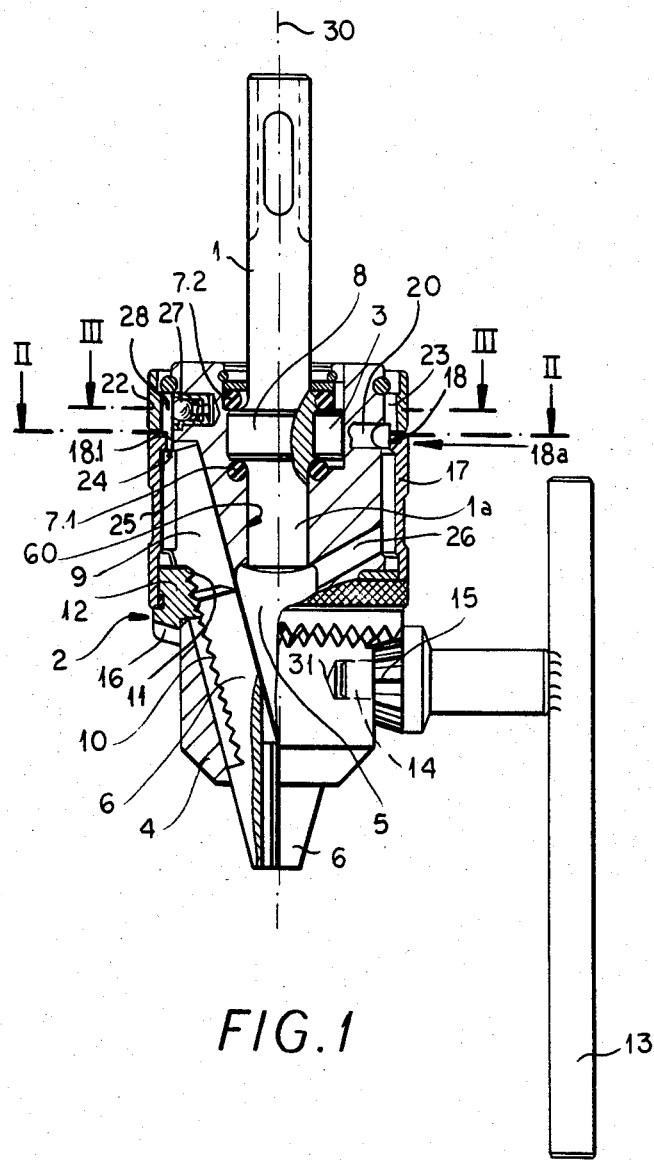
FIG. 1 is an axial section through a chuck according to the invention.

FIG. 1 shows a chuck 2 including a chuck body 4 which is provided with a through-passage 60 along the chuck axis 30. In the through-passage 60, a spindle 1 of a hammer drill or the like can be mounted for driving rotatably and applying axial impact to the chuck 2 and thus the chuck body 4. By means of a spherical ball or a cylindrical pin 3, the chuck body 4 is keyed to the spindle 1 in a rotation-fixed manner, however, a displacement of the chuck body 4 along the spindle 1 in axial direction is still possible.

Accommodated within the chuck body 4 in elongation of the through-passage 60 is a tool holding fixture socket or bore 5 for a respective implement or tool such as a hammer or percussion drill bit (not shown).

The tool holding fixture 5 cooperates with a plurality of jaws 6—usually three—for retaining the drill bit. The jaws 6 are guided within respective grooves 9 provided within the chuck body 4 and inclined at an acute angle relative to the axis 30. Along a major portion, each jaw 6 has an array of teeth 10 which is in engagement with an internal thread 11 of a tightening ring 12. The ring 12 is rotatably mounted on the chuck body 4 and is actuated by a chuck key 13 in order to move the jaws radially toward each other and axially away from spindle 1 when the drill bit is to be tightly clamped or radially apart and axially toward spindle 1 in case it is required to loosen the drill bit.

For providing the simultaneous movement of the jaws 6 within the associated grooves 9, the standard key 13 has a pinion 15 which cooperates with a serration or crown gear 16 of the ring 12 and is provided with a guide pin 14 projecting from the pinion 15 and insertable into a radially extending blind hole 31 in the chuck body 4. Consequently, by inserting the guide pin 14 of the key 13 into the blind hole 31 and engaging the pinion 15 with the serration 16, the jaws 6 can be moved within the grooves 9 to tighten and to loosen the drill bit.

When using the drill as a percussion drill, the striking action of the spindle 1 is transmitted via its end portion 1a which operates as an impact head onto the drill bit which is retained in the tool holding fixture 5 between the jaws 6. For preventing the striking action of the spindle 1 upon the drill bit from being transmitted directly to the chuck 2, the chuck body 4 is slightly movable along the spindle 1 in both axial directions and is resiliently supported by respective elastic rings 7.1, 7.2 against a collar 8 of the spindle 1.

Figure 2:
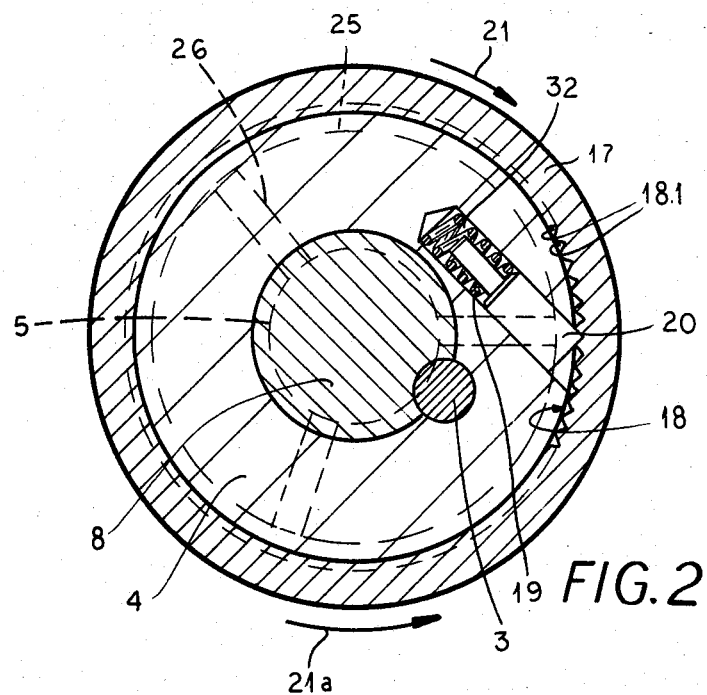
FIG. 2 is a larger-scale section through the chuck taken along line II—II of FIG. 1.

The tightening ring 12 is connected to a locking mechanism 18a provided to prevent an undesired unlocking of the chuck. For assembling reasons, the ring 12 is made of two parts which are kept together by an actuating sleeve 17. The locking mechanism 18a includes a toothed skirt 18 arranged at an upper portion of the sleeve 17. The toothed skirt 18 extends coaxially to the axis 30 and cooperates with a locking member 20 which is displaceable within a blind bore 32 of the chuck body 4. A compression spring 19 biases the locking member 20 towards the toothed skirt 18 so that the member 20 is forced to project into a respective gap 18.1 between adjacent teeth of the skirt 18 as is clearly shown in FIG. 2. Hence, a relative rotation of the chuck body 4 and the sleeve 17 in loosening direction as indicated by arrow 21 in FIG. 2 is prevented, however, a relative rotation in opposite direction, that is in tightening direction as indicated by arrow 21a is possible because the member 20 will merely glide along the respective flanks of the respective teeth when the member 20 is forced inwardly against the bias of the spring 19.

A loosening ring 22 is coaxial with the axis 30 and immediately above the toothed skirt 18 of the sleeve 17 around the chuck body 4 for allowing disengagement from outside of the locking member 20 out of the tooth skirt 18.

The loosening ring 22 is provided with a plurality of indentations 23a spaced along the inner side 22a of the ring 22 so that a corresponding number of axial channels or interstices 23 is defined between the loosening ring 22 and the chuck body 4.

Figure 3:
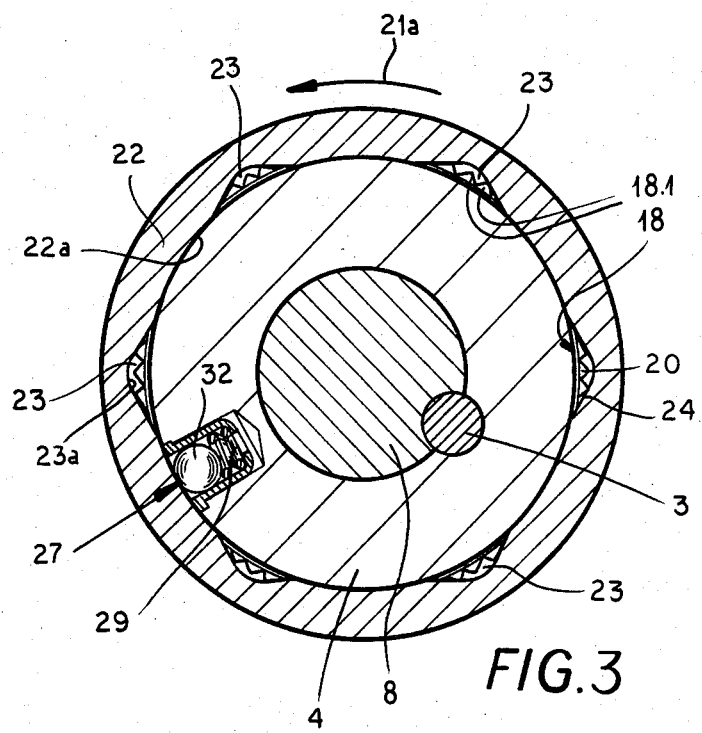
FIG. 3 is a larger-scale section through the chuck taken along line III—III of FIG. 1.

As can be seen in FIG. 3, the ring 22 is provided with six angularly equispaced indentations 23a. Since the interstices 23 are arranged adjacent to the toothed skirt 18 in axial direction, the member 20 when being in engagement with the toothed skirt 18 can also project into a respective one of the recesses 23. Thus, when the member 20 is to be disengaged from the toothed skirt 18, the ring 22 is rotated relative to the chuck body 4 in direction of arrow 21a until the flank 24 of the respective interstice 23 forces the member 20 inwardly out of contact with the toothed skirt 18 to allow the sleeve 17 to be rotated freely relative to the chuck body 4.

As can be further seen from FIGS. 1 and 3, the chuck body 4 accommodates a retaining or detent mechanism 27 including a spring 29 which radially outwardly biases a ball 32 for locking the ring 22 in a position with the ball in one of the interstices 23.

Referring now especially to FIG. 1, there can be seen that the sleeve 17 is arranged at a distance from the chuck body 4 so as to define an annular space 25 therebetween which is in communication with the gaps 18.1 between adjacent teeth of the skirt 18 and with the interstices 23. The gaps 18.1 as well as the interstices 23 are open towards the outside in axial direction and form together discharge outlets 28 in prolongation to the annular space 25 which also communicates with the tool holding fixture 5 via a plurality of channels 26. The channels 26 lead to the tool holding fixture 5 immediately next to the axial through-passage 60 and extend at an open acute angle relative to the axis 30 in direction to the rear side of the chuck body 4. The cross-section of the channels 26 is sufficiently large to allow dirt entering during drilling to pass through the channels 26 into the annular space 25.

Consequently, during overhead drilling, dirt which enters from the drilling hole between the jaws 6 into the tool holding fixture 5 is transported immediately by means of centrifugal force and gravity through the channels 26 into the annular space 25 and eventually drops through the discharge openings 28 constituted by the gaps 18.1 and the interstices 23 out of the chuck to the outside.

I claim:

1. A chuck, comprising:

a chuck body rotatable about an axis and provided with a through-passage in direction of said axis;

holding means provided in elongation of said through-passage in said body for retaining an implement, said chuck body being formed with at least one channel leading to said holding means adjacent to said through-passage; and tightening means cooperating with said holding means for locking and loosening the implement retained within said holding means and having a plurality of discharge openings extending in the direction of said axis, said tightening means embracing said chuck body at a distance so as to define an annular space therebetween which is in communication with said discharge openings and said channel, whereby any detritus may be discharged through said at least one channel, annular space and openings to the exterior of the chuck, said tightening means including an actuating sleeve having an inner side provided with a toothed skirt defining gaps between adjacent teeth which gaps are open in the direction of said axis and form a part of said discharge openings, and a locking member engageable with said toothed skirt for preventing a relative motion between said chuck body and said actuating sleeve, and a loosening ring on said chuck body, said loosening ring being axially aligned with said actuating sleeve and having a periphery provided with indentations spaced along said periphery so that respective interstices are defined between said chuck body and said loosening ring, said interstices extending outwardly and being in alignment with said gaps and forming another part of said discharge openings.

2. A chuck as defined in claim 1 wherein said channel extends at an acute angle to said axis.

3. A chuck for a hammer drill, comprising:

a chuck body formed with an axial passage aligned and connected with a bore receiving a drill bit, and a plurality of guides inclined toward and opening into said bore remote from said passage;

a spindle carrying said chuck body and rotationally connected therewith while being axially displaceable at least limitedly relative to said body so as to transmit impact directly from an end of said spindle to an end of said bit;

respective jaws received in said guides for engagement with said bit; and an actuating sleeve rotatably mounted on said body and engaging said jaws for displacing them toward and away from said bit along said guides, said sleeve defining an annular detritus-clearing space around said body opening axially to the exterior of the chuck, said body being formed with a plurality of channels communicating with said space and opening into said bore adjacent said passage to discharge detritus outwardly at least in part by centrifugal forces, said channels extending generally radially and being inclined toward said bore away from said pasage, said actuating sleeve having a ring closing said space at an end proximal to said jaws and provided with formations engaging said jaws, said space being open to the exterior of the chuck at an end opposite said ring, whereby any detritus may be discharged through said channels and said space to the exterior of said chuck, said sleeve having at said end opposite said ring an array of inwardly directed teeth, said space being open to the exterior between said teeth, said body being provided with a locking pin in a blind bore of said body and spring biased into engagement with said teeth for preventing rotation of said sleeve in one direction tending to loosen said bit in said chuck until said pin is pushed into said blind bore, said chuck further comprising a loosening ring rotatable about said body around said pin, said loosening ring having cam formations at spaced intervals for pressing said pin into said blind bore, said loosening ring being provided with recesses between said cam formations communicating between the exterior and interstices between said teeth for discharging detritus.

4. The chuck defined in claim 3, further comprising indexing means including a detent ball engageable in said recesses for indexing said loosening ring so that said pin also extends into one of said recesses.

* * * * *